(12) United States Patent
Forbis

(10) Patent No.: US 7,915,542 B2
(45) Date of Patent: Mar. 29, 2011

(54) ELECTRICAL CABLE SUPPORT BRACKET

(76) Inventor: Robert C. Forbis, Naples, FL (US)

( * ) Notice: Subject to any disclaimer, the term of this patent is extended or adjusted under 35 U.S.C. 154(b) by 150 days.

(21) Appl. No.: 12/170,424

(22) Filed: Jul. 9, 2008

(65) Prior Publication Data

US 2009/0014210 A1    Jan. 15, 2009

Related U.S. Application Data

(60) Provisional application No. 60/948,575, filed on Jul. 9, 2007.

(51) Int. Cl.
*H02B 1/40* (2006.01)

(52) U.S. Cl. ......... 174/480; 174/101; 174/68.3; 248/49; 439/719

(58) Field of Classification Search .................. 174/101, 174/480, 68.3, 135; 439/719; 312/223.6; 248/49, 68.1, 74.3

See application file for complete search history.

(56) References Cited

U.S. PATENT DOCUMENTS

| 3,659,319 | A | | 5/1972 | Erickson |
| 4,097,106 | A | | 6/1978 | Over et al. |
| 4,253,629 | A | | 3/1981 | Wilmes |
| 4,601,530 | A | | 7/1986 | Coldren et al. |
| 4,836,803 | A | | 6/1989 | Seidel |
| 5,089,667 | A | * | 2/1992 | Goussin et al. ............... 174/101 |
| D326,999 | S | | 6/1992 | Johnson et al. |
| D336,421 | S | | 6/1993 | Grubicy et al. |
| 5,370,558 | A | | 12/1994 | Scherer et al. |
| 5,554,053 | A | | 9/1996 | Matthews |
| 5,659,949 | A | | 8/1997 | Ohba et al. |
| 5,918,837 | A | * | 7/1999 | Vicain ............................. 248/49 |

\* cited by examiner

*Primary Examiner* — Dhiru R Patel
(74) *Attorney, Agent, or Firm* — Quarles & Brady LLP

(57) ABSTRACT

A cable support bracket includes a backplate with a number of structures extending transversely therefrom and defining a plurality of cable restraints and slots. The cable restraints have a series of projections formed on the transversely extending structures. Each cable restraint has a series of projections aligned so as to create matching barbs that secure electrical cables within the restraints. At least one transversely-extending structure acts as a spacer to ensure that electrical safety requirements regarding the distance between cables and internal walls are met when the bracket is installed.

15 Claims, 7 Drawing Sheets

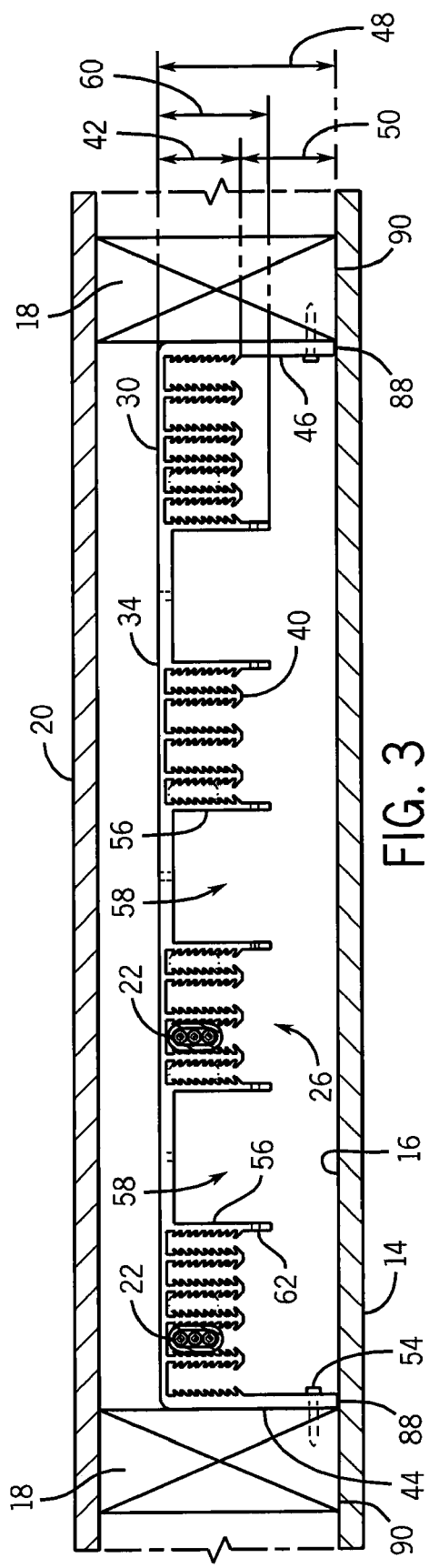
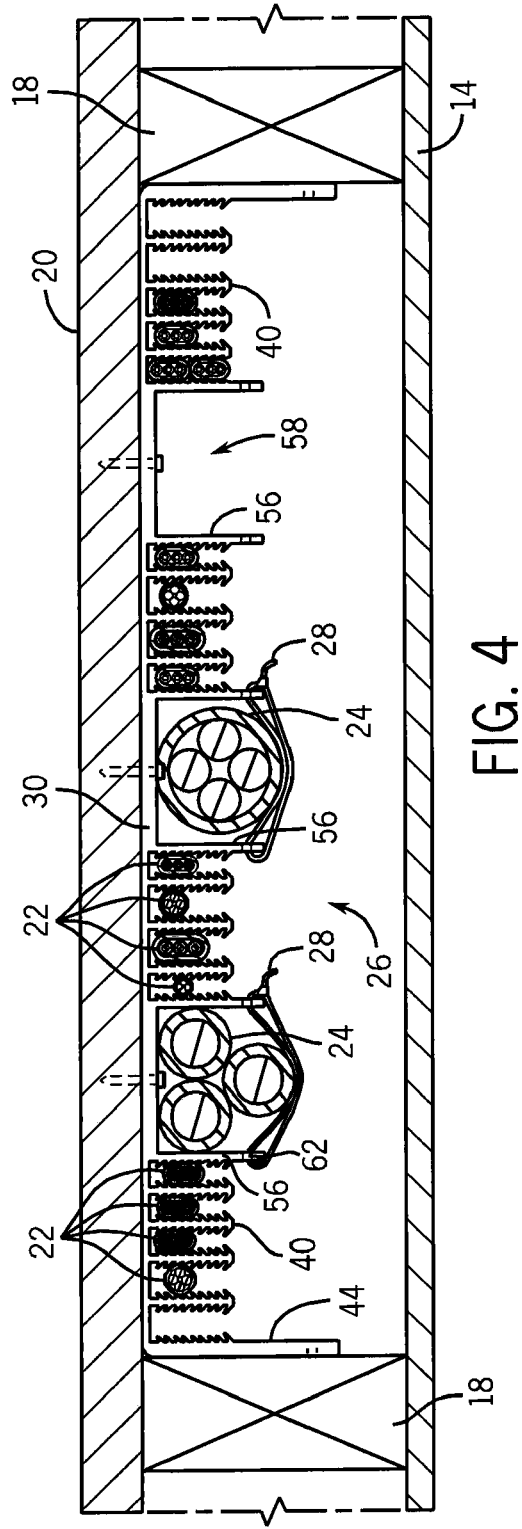

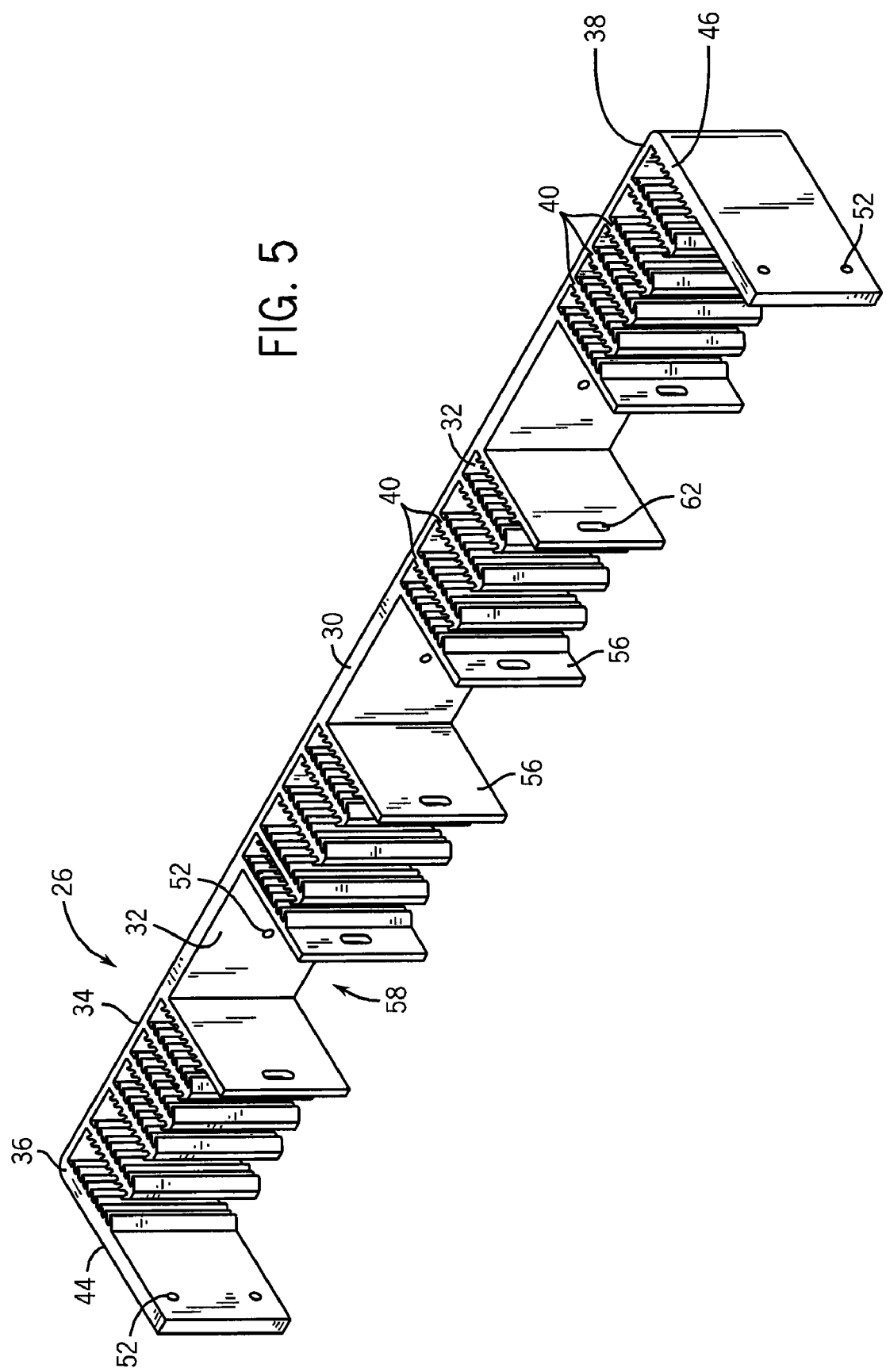

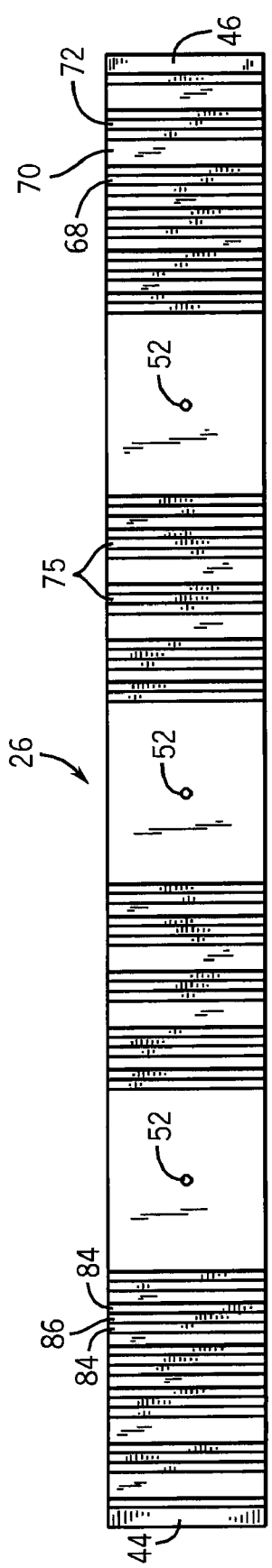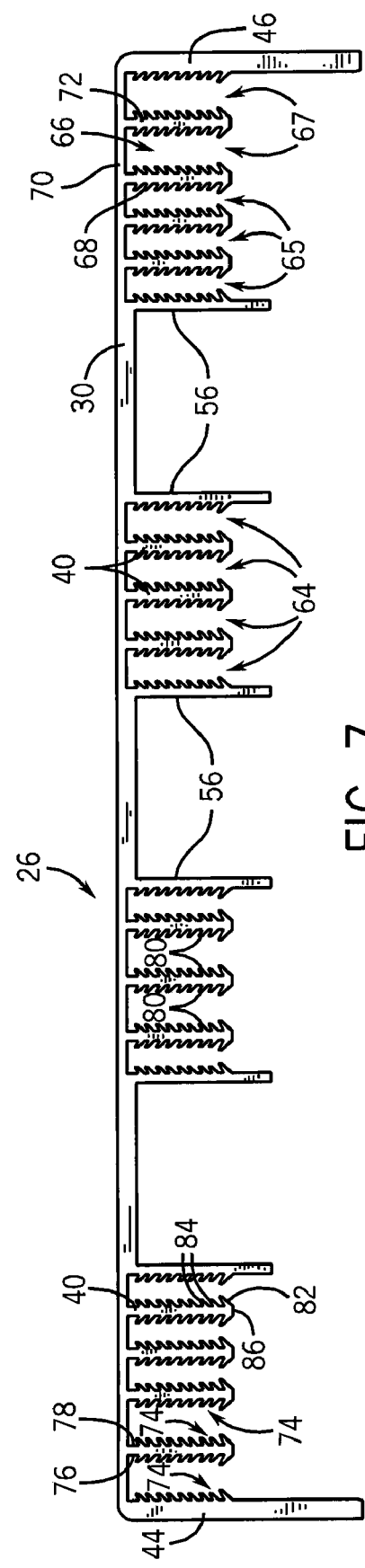

ELECTRICAL CABLE SUPPORT BRACKET

CROSS REFERENCE TO RELATED APPLICATIONS

This application claims priority to U.S. Provisional Patent Application No. 60/948,575 filed on Jul. 9, 2007, the contents of which are hereby incorporated by reference as if fully set forth herein in their entirety.

STATEMENT REGARDING FEDERALLY SPONSORED RESEARCH

Not applicable.

BACKGROUND OF THE INVENTION

The present invention generally relates to the installation and mounting of electrical wires and cables. In particular, the present invention relates to vertically-mounted support brackets suitable for securing electrical wires or optical cables thereto. Even more particularly, this invention relates to wall-mounted support brackets which secure cables and wires in close proximity to electrical enclosure in compliance with electrical safety standards.

Certain electrical safety standards dictate the proper installation and securing means for wiring and cabling entering and exiting enclosures, such as an electrical circuit breaker panel or a junction box. One such standard, the National Electrical Code (NEC) calls for wires entering and exiting the top of a circuit breaker panel be supported at a distance of twelve inches above the panel. National Electrical Code and NEC are trademarks of the National Fire Protection Association, Inc.

One commonly used method to comply with this requirement, includes mounting a piece of wood to the wall above the panel and securing the wires to the wood with stables or another suitable fastener. An alternative method includes using a channel-shaped sheet metal bracket and cable ties to secure the wires.

While these approaches may work as intended, they are very time consuming. These installation methods require that the electrician or installer obtain a suitable piece of wood or metal, cut and/or shape the material into a custom bracket, and then fit the bracket into place. Furthermore, per at least the NEC, wires installed in this manner must be secured a minimum of one and a quarter inches (1¼") back from the face of adjacent studs to prevent standard drywall screws or nails from inadvertently coming into contact with the wires. Complying with this requirement further increases the time and effort needed to fabricate and install the custom bracket.

If the electrical circuit panel or enclosure is mounted to a masonry wall, or if the panel is otherwise surface mounted, proper fasteners, including masonry nails that can be nailed or otherwise fastened into the block or concrete, are needed. Because electrical enclosures such as circuit breaker panels typically accommodate a variety of different cable types (e.g., two, three, or more conductor power cables, multi-wire service entrance cables such as a 4 wire/0 gauge cable, as well as larger feeder cables), these cable types must also be secured to comply with the electrical safety regulations.

In response to these and other wiring problems, a number of wiring brackets have been designed in an attempt to facilitate the installation of wiring. For example, U.S. Pat. No. 5,659,949 discloses a method of manufacturing a wiring harness which includes a plate on which wire clips are mounted to facilitate the positioning of individual wires. While the disclosed method and tooling device are both suitable for their intended purpose of manufacturing a wiring harness made up of individual wires, they are not suitable for producing harnesses capable of holding three-wire, and larger, cables above an electrical box. First, the clips for the disclosed harness are not suitable for holding larger diameter cables. Second, there are no elements provided to facilitate mounting of the harness to a wall. Third, there are no provisions for ensuring the required 1¼ inches of spacing to reduce the likelihood of inadvertent contact with screws and nails.

U.S. Pat. No. 5,370,558 discloses a fixture for supporting a splicing module for telecommunications cables. The fixture has a body member, generally the size of a comb, formed with a series of raised teeth, spaced opposite edges, corresponding to the spacing of the contacts, and wire receiving channels in the splicing module. The teeth are spaced apart so as to receive and locate the wires in relationship to a splicing module placed on the body member between the rows of teeth. A retainer body member has an elongated planar portion with an upper and a lower surface which includes registration alignment posts on the body which cooperate with openings in the ends of the base to insure proper alignment of the body and base. Although this device is useful as a splicing fixture, it has the same drawbacks as the '949 patent for use as a cable support bracket.

Other prior art devices and methods are disclosed in U.S. Pat. Nos. D326,999, D336,421, 3,659,319, 4,253,629, 4,097, 106, 4,601,530, 4,836,803, 5,554,053. These devices and methods are suitable for their intended purposes, but each is deficient in some way for use as a cable support bracket.

Notwithstanding these developments, what is needed in the art is a cable support bracket which, when properly installed, provides sufficient spacing from associated walls and which securely holds the cables.

SUMMARY OF THE INVENTION

One aspect of the invention includes a cable support bracket having a backplate with a front surface and an opposed rear surface extending between a first and second end. At least one cable restraint is partially defined by the backplate and a transverse post that extends a first predetermined distance from the backplate. A first spacer is connected to the backplate and extends transversely from the backplate a second predetermined distance, wherein the second predetermined distance is greater than the first predetermined distance by a third predetermined distance.

The invention comprises, in another form thereof, a cable support bracket which includes a backplate having a front surface, an opposed facing rear surface, a first end, and a second end opposed to the first end. First and second spacers are connected to the backplate at the first and second ends, respectively, and extend transversely therefrom. A number of cable restraints are located between the spacers and are partially defined by the backplate and at least one transverse post. A number of partitions transversely extend from the backplate and act to separate a first set of cable restraints from a second set of cable restraints. Partitions are separated from other partitions by a wide and open slot.

An advantage of the present invention is that it provides a cable support bracket with integral spacers which separate the cable restraints, and corresponding cables, a minimum distance from an interior wall, such as one formed of drywall.

Another advantage of the present invention is that it can accommodate a variety of different cable types, such as three (or more) wire power cables; multi-wire service entrance cables; as well as larger feeder cables.

Yet another advantage of the present invention is that it does not require an electrician and/or installer to fabricate a custom bracket.

Yet another advantage of the present invention is that it does not require special tools, such as an electric power saw or other power tool, for installation.

Yet another advantage of the present invention is that it is cost effective to manufacture.

Yet another advantage of the present invention is that it saves the electrician's and/or installer's time during the installation of an electrical box or panel.

Yet another advantage of the present invention is that it can easily be made of a fire resistant and/or electrically insulating material, such as fire resistant polyvinyl chloride (PVC), or other suitable materials.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 3 is a cross-sectional view taken along section line 3-3 of FIG. 1;

FIG. 4 is a cross-sectional view similar to FIG. 3, but showing an alternative mounting arrangement;

FIG. 5 is a perspective view of the cable support bracket of FIG. 1;

FIG. 6 is a front view of the cable support bracket of FIG. 1;

FIG. 7 is a top view of the cable support bracket of FIG. 1;

Figure 1:
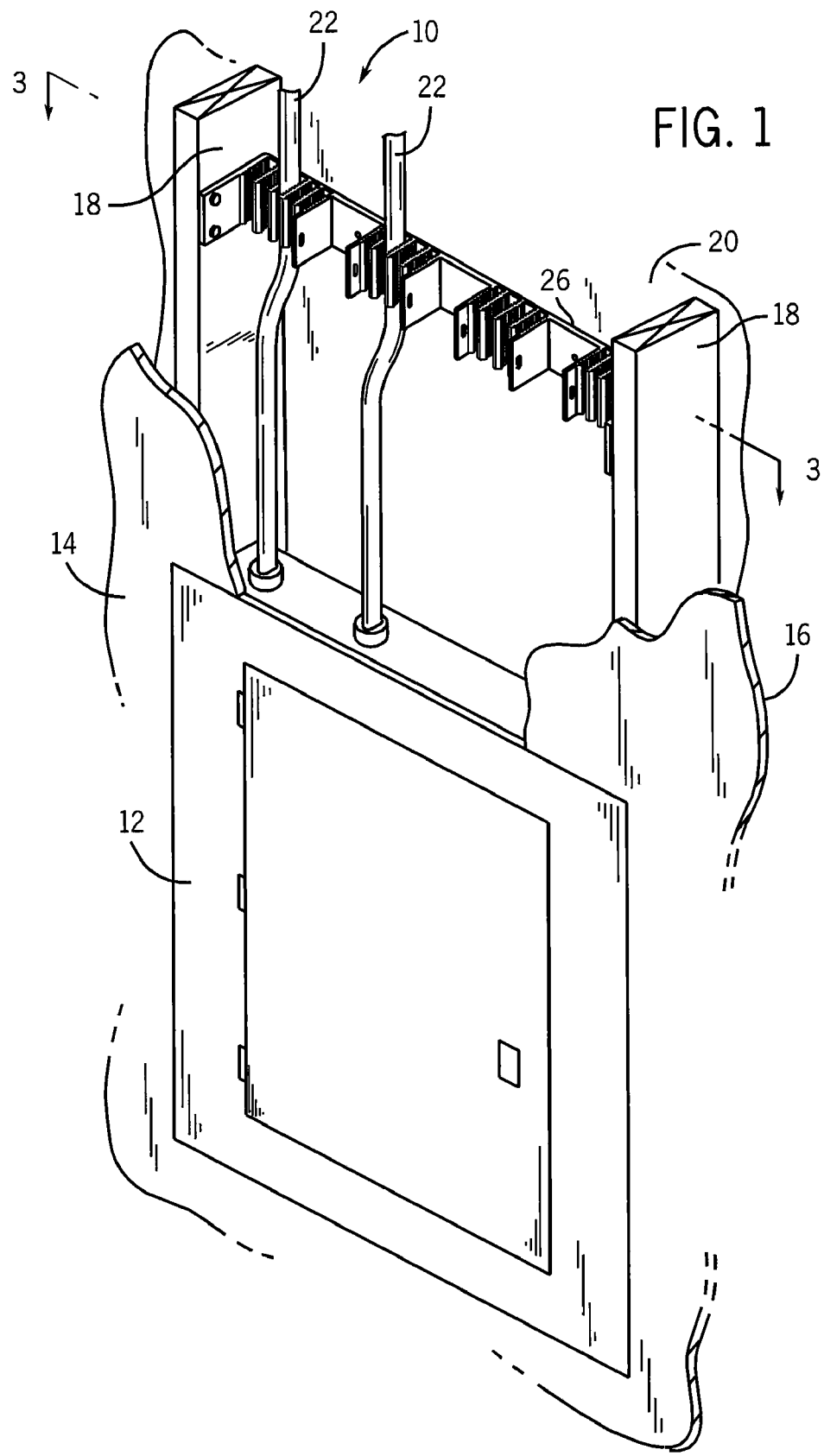
FIG. 1 is a fragmentary perspective view of an electrical arrangement including an electrical box mounted between studs on a wall and an embodiment of the cable support bracket constructed in accordance with one aspect of the present invention.
Figure 2:
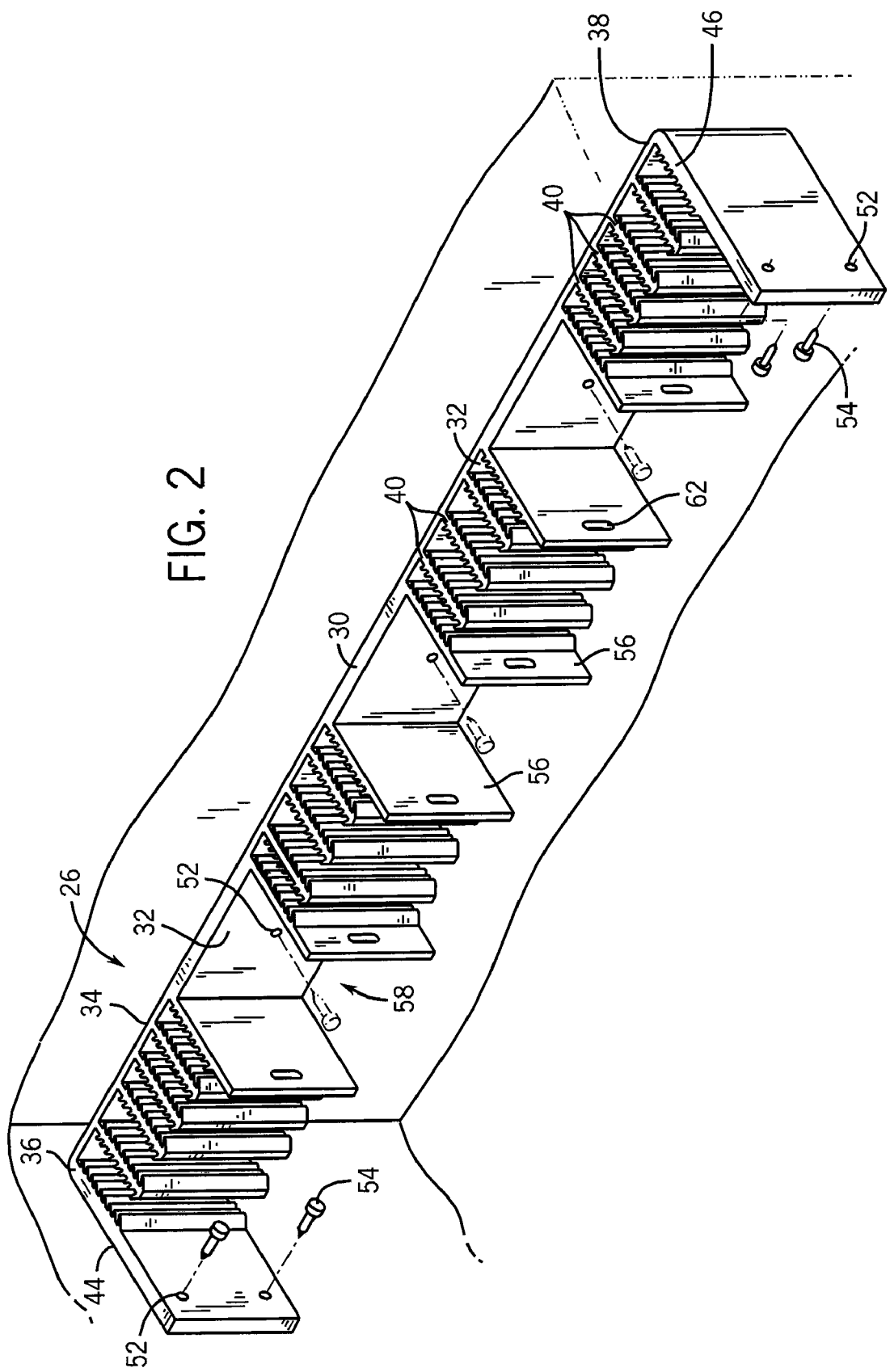
FIG. 2 is an exploded perspective view of the cable support bracket of FIG. 1.
Figure 8:
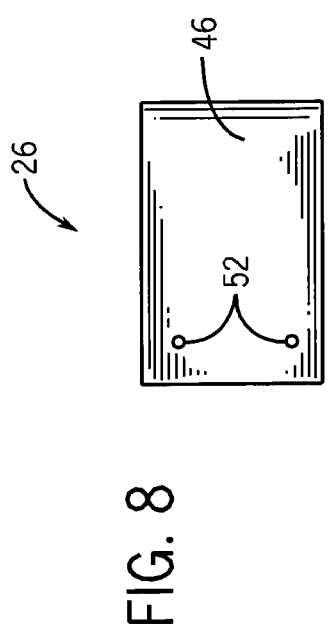
FIG. 8 is an side view of the cable support bracket of FIG. 1.
Figure 9:
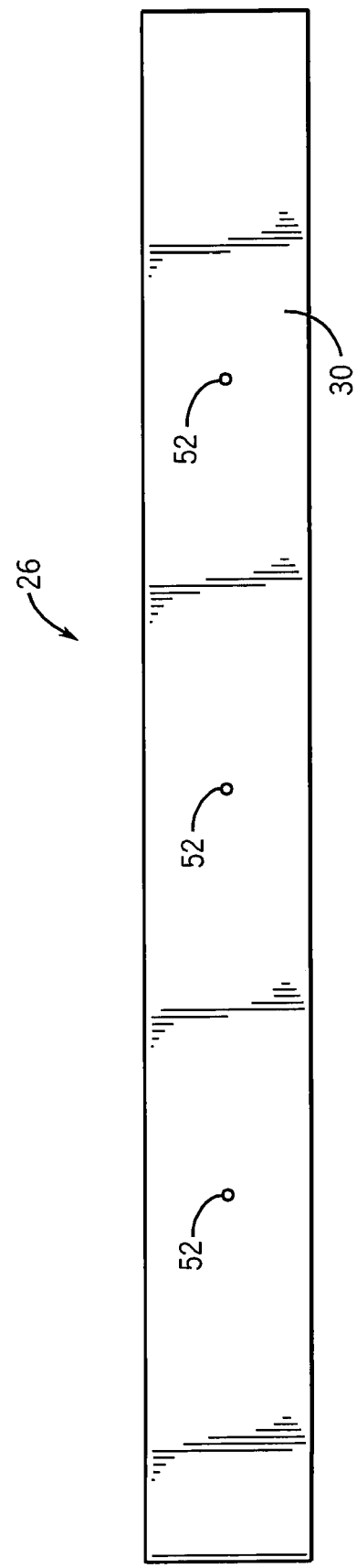
FIG. 9 is a rear view of the cable support bracket of FIG. 1

The following description of a preferred embodiment of the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Referring now to the drawings, an electrical arrangement 10 includes an electrical enclosure, or box, 12 mounted in close proximity to a first wall 14, such as an interior wall formed of drywall having an inner surface 16. The electrical box 12 and drywall 14 may be mounted to a pair of adjacent studs 18, which are themselves secured to a second wall 20, such as a concrete or masonry exterior or structural wall. A number of multi-wire cables 22, 24 (see FIG. 4) extend from the electrical box 12 and are secured to and supported by a cable support bracket 26 constructed in accordance with an exemplary embodiment of the present invention. The cables 22, 24 extend into and are terminated inside of the electrical box 12 with any number of various electrical termination devices (not shown), including, but not limited to, circuit breakers, fuse blocks, terminal strips, connectors, transformers, controllers and other similar electrical terminating components.

The first, smaller, set of cables 22 are illustrated as two or three copper conductor cables having a ground wire. One such type of cable is known as type NM-B (nonmetallic-sheathed) and is primarily used in residential wiring as branch circuits for outlets, switches, and other loads. Branch cable sizes suitable to be secured by the bracket 26 include 14/2 (two fourteen gauge conductors and a ground), 14/3 (three fourteen gauge conductors and a ground), 12/2, 12/3, 10/2, 10/3, 8/2, 8/3, 6/2, and 6/3, a number of which are illustrated in FIG. 3.

Such a cable 22 is required by certain electrical safety regulations, such as the NEC to be secured at least a minimum distance above the box 12 and at least a minimum distance from the inner surface 16 of the first wall 14.

The second multi-wire cable 24, as illustrated, is a multi-wire service entrance (SE) cable such as a four conductor 4/0 SER aluminum cable. Feeder cable sizes suitable to be secured by the bracket 26 include two or three conductor with bare ground, sized 4/0 SER, 2/0, 1/2, #1, or #2, a number of which are also illustrated in FIG. 3. These larger feeder cables 24 are secured to the cable support bracket 26 with one or more tie wraps 28, or other suitable fasteners as shown in FIG. 4.

Referring more particularly to FIGS. 2-9, the cable support bracket 26 includes a backplate 30 having a front surface 32 and an opposed rear-facing surface 34. The backplate 30 extends longitudinally between a first end 36 and a second end 38. The bracket 26 further includes a number of posts 40 extending transversely from the backplate 30. As shown in FIG. 3 and explained in greater detail below, each post 40 extends a first predetermined distance 42 outwardly from the rear surface 34.

The support bracket 26 further includes a first spacer, or side wall, 44 connected to the backplate 30 at the first end 36 and a second spacer 46 connected to the backplate 30 at the second end 38. The first and second spacers 44, 46 extend transversely from the backplate 30 a second predetermined distance 48 from the rear surface 34. The second predetermined distance 48 is greater than the first predetermined distance 42 by a third predetermined distance 50.

The cable support bracket 26 includes fastener holes 52 formed in each of the first spacer 44, second spacer 46 and backplate 30. Fasteners, such as masonry nails 54, may be used to mount the cable support bracket 26 to either the adjacent studs 18 (see FIG. 3), the second wall 20 (see FIG. 4), or both. Together, the spacers 44, 46 and/or the backplate 30 are the support structure for the cable support bracket 26 which is able to support a multitude of cables 22, 24 mounted thereto.

The cable support bracket 26 further includes a number of partitions 56 extending transversely from the backplate 30. Each partition 56 separates a series of posts 40 from a feeder cable slot 58. The partitions 56 extend a fourth predetermined distance 60 from the rear surface 34, where the fourth predetermined distance 60 is between the first predetermined distance 42 and the second predetermined distance 48. Each partition 56 includes a slot 62 formed therein. As shown in FIGS. 4 and 5, the slots 62 are oblong-shaped to facilitate the insertion of tie-wraps 28 therethrough. It is contemplated that the slots 62 may be formed at various locations on the partition 56 and in alternate shapes depending on the particular application.

As shown best in FIG. 7, the cable bracket 26 includes a number of cable restraints 64 for securing the two and three conductor cables 22 therein. Each cable restraint 64 includes a retaining slot, 66 defined by a first side 68 that is either one of the spacers 44, 46, posts 40, or partitions 56, a second side 70 that is a portion of the backplate 30, and a third side 72 that is either an adjacent spacer 44, 46, post 40, or partition 56. The cable restraints 64 may have different size slots 66 for different types of cable. For example, narrow cable restraints 65 and wide cable restraints 67 are illustrated.

Each cable restraint 64 further includes a series of hooked projections 74 on each of the first and third sides 68, 72 (i.e., spacer 44, 46, post 40, or partition 56). In the embodiment shown, the hooked projections 74 are acutely angled inwardly towards the backplate 30 and culminate with a pointed tip 80. Each post 40 includes a series of projections 74 on a first face 76 and a series of projections 74 on a second, opposing face 78. Each spacer 44, 46 and partition 56 includes a series of matching projections 74 such that any of the posts 40, spacers 44, 46, and partitions 56 may function as the first or third side 68, 72 of the cable restraint 64.

In one aspect of the present invention, each series of projections 74 includes one larger barbed projection 82 and a number of smaller barbed projections 84. In each series of projections 74, the larger projection 82 is located furthest away from the backplane 30 (such as at a tip 86 of each post 40) and thus, closest to the inner wall 14. The smaller projections 84 are spaced apart and extend between the larger projection 82 and the backplate 30. Each of the projections 74 on the posts 40, spacers 44, 46 and partitions 56 are formed so as to be aligned with the projections 74 on adjacent posts 40. Together, an opposing series of projections 74 form a pair of opposed barbs that act to maintain and secure cables 22 within the slots 66.

To secure a branch circuit cable 22 within a cable restraint 64, a pressing force is applied to the cable 22 directed towards the backplate 30. After a sufficient pressing force has been applied, the cable 22 is inserted into the cable receiving space 66 by any of the deformation of the projections 74, the compression of the cable 22, and the outward flexing of the first and third side 68, 72 of the cable restraint 64. After the cable 22 has been fully inserted into the receiving space 66, the projections 74 and sides 68, 72 (i.e., posts 40 or partition 56) return to their normal position. The inwardly pointed tips 80 of the projections 74 contain the cable 22 within the space 66 and prevent the cable 22 from moving at least in a transverse direction.

As discussed above, the cable bracket 26 includes a plurality of partitions 56. Each partition 56 separates a series of cable restraints 64 from an adjacent series of cable restraints 64. The space between partitions 56 functions as a feeder cable slot 58. The feeder cable slot 58 accommodates larger types of cables and cable bundles. As shown in FIG. 4, feeder cable 24 is secured within the feeder cable slot 58 with tie wraps 28.

In order to ensure that the branch circuit cables 22 are installed at least the minimum distance away from the inner surface 16 of the drywall 12 as required by the aforementioned electrical safety standards, the third predetermined distance 50 is approximately one and one quarter inches (1.25"). Therefore, regardless of the positioning of the bracket 26 between the first and second walls 14, 20, at least the minimum required distance is maintained between the inner surface 16 and the cables 22.

For example, as shown in FIG. 3, the ends 88 of the spacers 44, 46 are aligned with the front faces 90 of the studs 18 and mounted flush with the inner surface 16 of the inner wall 14. The minimum distance is maintained because each of the conductors 22 are maintained greater than the third predetermined distance (here 1.25") away from the inner surface 16 of the inner wall 14. In FIG. 4, the bracket 26 is mounted to the outer wall 20 so as to provide the minimum distance between the inner surface 16 and the feeder cable 24.

In one embodiment, the bracket 26 has an overall width of fourteen and one eighth inches (14⅛") inches to match the standard spacing between studs 18, although other widths are considered to be within the scope of this invention. In a still further embodiment, the bracket 26 is made out of fire resistant polyvinyl chloride (PVC), or other similar plastics materials.

Figure 10:
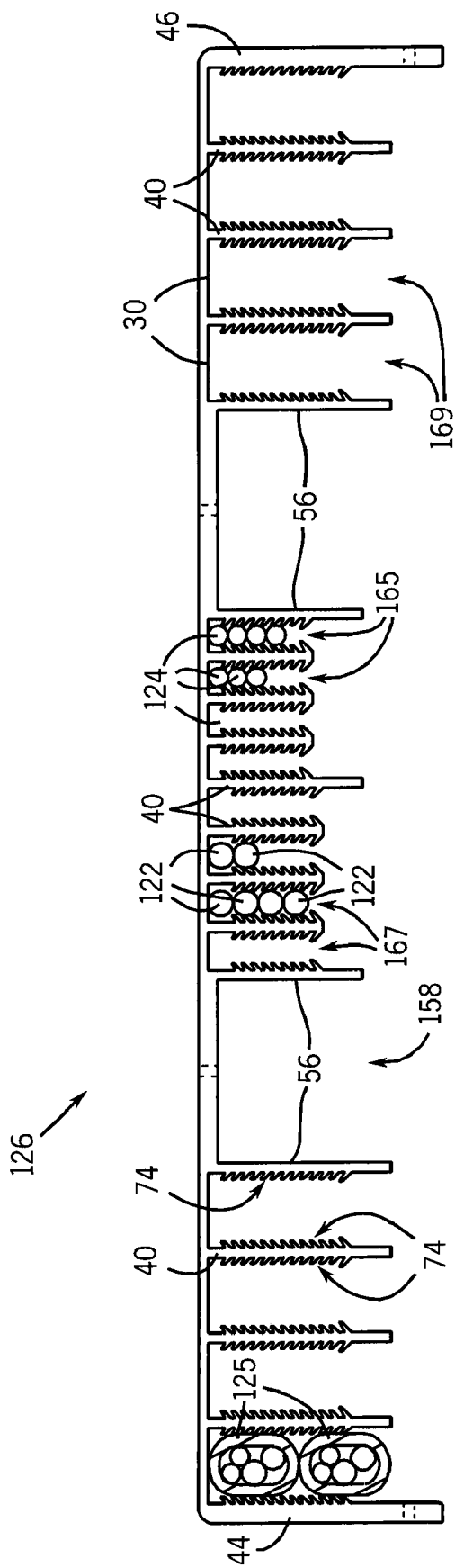
FIG. 10 is a top view of a cable support bracket constructed in accordance with a second aspect of the present invention.

An alternative, low voltage, cable support bracket 126 for use in communication cable installations is illustrated in FIG. 10. Like the bracket 26 shown in FIGS. 1-9, the low voltage bracket 126 includes cable restraints of different widths. A first set of cable restraints 165 accommodates at least four twisted pair (i.e., CAT5e) cables 124. A second set of cable restraints 167 accommodates up to four coaxial (i.e., RG6) cables 122. A third set of cable restraints 169 accommodates at least two bundled cable 125, wherein the bundled cable 125 includes a number of twisted pair and coaxial cables. A number of wide slots 158 are also provided and used for other low voltage communication cables as needed.

As shown, the projections 74 extend over a substantial length of the posts 40. As shown, a single cable 124 may be firmly secured within a cable restraint 165 against the backplate 30 because of projections 74. Alternatively, more than one cable 124 may be pressed together into a cable restraint 165 and held tightly in place together.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

I claim:

1. A cable support bracket, comprising:
   a backplate having a front surface and an opposed substantially planar rear surface, the backplate further having a first end and a second end opposed to the first end;
   a first spacer extending transversely from the front surface of the backplate at the first end, said first spacer including at least one fastener hole for receiving a fastener mounting the cable support bracket to a first stud adjacent said first spacer;
   a second spacer extending from transversely from the front surface of the backplate at the second end, said second spacer including at least one fastener hole for receiving a fastener mounting the cable support bracket to a second stud adjacent said second spacer;
   cable restraint partially defined by a portion of the backplate and a first post extending transversely from the front surface of the backplate and a second post extending transversely from the front surface of the backplate, said cable restraint for receiving at least one first cable between said first and second posts; and
   a first partition extending transversely from the front surface of the backplate separating said first and second posts from a feeder cable slot extending a distance along said backplate, said feeder cable slot for receiving at least one feeder cable therethrough, said at least one feeder cable having a diameter that prevents said at least one feeder cable from being received between said first and second posts, and said first partition extending from the front surface a distance greater than said first and second posts.

2. The cable support bracket of claim 1, wherein at least one of the first and second spacers forms part of the cable restraint.

3. The cable support bracket of claim 1, in which said first partition separates said feeder cable slot from one of said first spacer and said second spacer, said cable support bracket further comprising a second partition extending transversely from the front surface of the backplate and separating the feeder cable slot from the other of said first spacer and said second spacer.

4. The cable support bracket of claim 3, wherein the first partition and said second partition transversely extends away from said front surface of the backplate a distance greater than the posts and less than the spacers.

5. The cable support bracket of claim 3, wherein the first partition and said second partition includes a slot extending through a portion of each of said partitions extending from said front surface of the backplate a distance greater than said posts, said slots receiving a tie wrap therethrough for retaining said feeder cable in said feeder cable slot.

6. The cable support bracket of claim 5, wherein the slot in each of said partitions is oblong-shaped.

7. The cable support bracket of claim 1, wherein the first partition forms part of the cable restraint.

8. The cable support bracket of claim 1, wherein at least one of said first and second posts comprises at least one projection angled towards the backplate.

9. The cable support bracket of claim 1, wherein the cable restraint is defined by said first post having a plurality of projections on a first side, said second post having a plurality of projections on a side facing the first post, and a portion of the backplate extending therebetween.

10. The cable support bracket of claim 9, wherein the plurality of projections on the first post and the plurality of projections on the second post are aligned so as to include at least one pair of opposed barbs between the first and second posts.

11. The cable support bracket of claim 10, wherein the opposed barbs of the at least one pair include a tip equidistant from the front surface.

12. The cable support bracket of claim 1, wherein the cable restraint is further defined by said first post having a plurality of projections on a first side and said first spacer having a plurality of projections on a side facing the first post.

13. The cable support bracket of claim 12, wherein the plurality of projections on the first post and the plurality of projections on the first spacer include at least one pair of opposed barbs.

14. The cable support bracket of claim 13, wherein the opposed barbs of the at least one pair includes first tips equidistant from the front surface.

15. The cable support bracket of claim 13, wherein each of the plurality of projections include a transversely outer pair of opposed barbs having a first gap therebetween and at least one transversely inner pair of opposed barbs having a second gap therebetween, the first gap being smaller than the second gap.

* * * * *